United States Patent
Ueda et al.

[11] Patent Number: 5,977,651
[45] Date of Patent: Nov. 2, 1999

[54] DRIVE CIRCUIT FOR VEHICLE OCCUPANT SAFETY APPARATUS

[75] Inventors: Nobumasa Ueda, Aichi-ken; Nobuo Mayumi, Toyohashi; Mitsuhiro Saitou, Oobu; Shoichi Okuda, Gamagoori, all of Japan

[73] Assignee: Denso Corporation, Kariya, Japan

[21] Appl. No.: 08/962,321

[22] Filed: Oct. 31, 1997

[30] Foreign Application Priority Data

Jun. 5, 1996 [JP] Japan ..................................... 8-143050
May 12, 1997 [JP] Japan ..................................... 9-121150

[51] Int. Cl.⁶ .................................................. B60R 21/32
[52] U.S. Cl. .......................... 307/10.1; 180/271; 280/735
[58] Field of Search .................................... 307/9.1, 10.1, 307/121; 280/734, 735; 340/436, 438, 669; 180/282, 271; 701/45; 323/315; 327/53, 55, 490; 330/257, 288

[56] References Cited

U.S. PATENT DOCUMENTS

| | | |
|---|---|---|
| 4,419,631 | 12/1983 | Bertails et al. . |
| 4,553,084 | 11/1985 | Wrathall . |
| 4,675,561 | 6/1987 | Bowers . |
| 5,058,920 | 10/1991 | Burger et al. . |
| 5,081,379 | 1/1992 | Korteling . |
| 5,135,254 | 8/1992 | Masegi et al. . |
| 5,159,516 | 10/1992 | Fujihira . |
| 5,204,547 | 4/1993 | Schumacher et al. . |
| 5,670,829 | 9/1997 | Susak ..................................... 307/10.1 |
| 5,675,242 | 10/1997 | Nakano ................................. 307/10.1 |
| 5,734,317 | 3/1998 | Bennett et al. ....................... 307/10.1 |

FOREIGN PATENT DOCUMENTS

| | | |
|---|---|---|
| 0 647 894 A2 | 7/1994 | European Pat. Off. . |
| 56-171361 | 12/1981 | Japan . |
| 5-294206 | 11/1993 | Japan . |

*Primary Examiner*—Richard T. Elms
*Attorney, Agent, or Firm*—Pillsbury Madison & Sutro LLP

[57] ABSTRACT

A drive circuit for a vehicle occupant safety apparatus includes a device for activating the vehicle occupant safety apparatus. A first transistor is connected in series with the device. A constant-current circuit receives electric energy from a power supply, and feeds a constant current to the device when the first transistor falls into its on state. The constant-current circuit includes a second transistor connected in series with the device. The second transistor includes an N-channel field-effect transistor. A third transistor is connected to the second transistor. The second and third transistors form a current mirror circuit. The third transistor includes an N-channel field-effect transistor. A voltage between a gate and a source of the third transistor is regulated at a constant level. Gate voltages of the second and third transistors are controlled in response to source voltages of the second and third transistors to equalize the source voltages of the second and third transistors.

13 Claims, 4 Drawing Sheets

DRIVE CIRCUIT FOR VEHICLE OCCUPANT SAFETY APPARATUS

BACKGROUND OF THE INVENTION

1. Field of the Invention

This invention relates to a drive circuit for a vehicle occupant safety apparatus such as an air-bag apparatus or a vehicle safety-belt pretensioner (tightner). Also, this invention relates to a constant-current control circuit usable in various circuits such as a drive circuit for a vehicle occupant safety apparatus.

2. Description of the Related Art

A known vehicle air-bag system includes air bags and squibs for activating the air bags respectively. The squibs are connected to an electric power supply via resistors respectively. An energy storage backup capacitor is connected in parallel to the electric power supply. The squibs are arranged in parallel to each other. When one of the squibs falls into a short-circuited state, the arrangement of the resistors connected to the squibs enables the other squibs to receive necessary drive currents from the electric power supply and the backup capacitor. However, the resistors consume certain amounts of electric power, requiring greater power feeding capabilities of the electric power supply or the backup capacitor.

U.S. Pat. No. 5,135,254 corresponding to Japanese published unexamined patent application 4-2544 discloses a vehicle air-bag apparatus in which squibs are connected via respective constant-current circuits to a vehicle battery and a backup capacitor. The constant-current circuits serve to regulate drive currents (firing currents) to the squibs at constant levels, respectively. Each of the constant-current circuits has a current sensing resistor for generating a voltage thereacross which is proportional to a current flowing through a related squib. The current sensing resistor is disposed in a current flow path to the related squib. Therefore, the current sensing resistor consumes a portion of electric power fed toward the related squib.

U.S. Pat. No. 5,204,547 corresponding to Japanese published unexamined patent application 4-500641 discloses an air-bag system for protecting the occupants of a motor vehicle in the event of a collision. The air-bag system has a plurality of firing circuits comprising air-bag igniters in series with respective power transistors which can be triggered in the event of an accident to inflate a corresponding plurality of air bags. A single energy storage capacitor is connected to all of the firing circuits for supplying energy to activate the air-bag igniters in the event that there is a loss of a battery voltage when the system has been actuated. A comparator monitors the voltage drops across respective resistors (current sensing resistors) in series with the power transistors, and reduces the currents through these transistors in the event that excessive currents are detected. Steps are taken to ensure that the period of activation of the current supply to the air-bag igniters is limited. Each of the current sensing resistors is disposed in a current flow path to the related air-bag igniter. Therefore, the current sensing resistor consumes a portion of electric power fed toward the related air-bag igniter.

SUMMARY OF THE INVENTION

It is a first object of this invention to provide an improved drive circuit for a vehicle occupant safety apparatus.

It is a second object of this invention to provide an improved constant-current control circuit.

A first aspect of this invention provides a drive circuit for a vehicle occupant safety apparatus, comprising a device for activating the vehicle occupant safety apparatus; a first transistor connected in series with the device; a power supply; and a constant-current circuit receiving electric energy from the power supply, and feeding a constant current to the device when the first transistor falls into its on state; wherein the constant-current circuit comprises a) a second transistor connected in series with the device, the second transistor including an N-channel field-effect transistor; b) a third transistor connected to the second transistor, the second and third transistors forming a current mirror circuit, the third transistor including an N-channel field-effect transistor; c) first means for regulating a voltage between a gate and a source of the third transistor at a constant level; and d) second means for controlling gate voltages of the second and third transistors in response to source voltages of the second and third transistors to equalize the source voltages of the second and third transistors.

A second aspect of this invention is based on the first aspect thereof, and provides a drive circuit wherein the first means comprises a constant-current source for enabling a constant current to flow through the third transistor.

A third aspect of this invention is based on the first aspect thereof, and provides a drive circuit wherein the second means comprises an operational amplifier having a non-inverting input terminal, an inverting input terminal, and an output terminal, the non-inverting input terminal being subjected to the source voltage of the second transistor, the inverting input terminal being subjected to the source voltage of the third transistor, the output terminal being connected to gates of the second and third transistors.

A fourth aspect of this invention is based on the third aspect thereof, and provides a drive circuit wherein the operational amplifier includes a compensation circuit for getting phase and gain margin, the compensation circuit comprising a resistor and a capacitor.

A fifth aspect of this invention is based on the third aspect thereof, and provides a drive circuit wherein the operational amplifier comprises means for charging and discharging the gates of the second and third transistors at a constant current.

A sixth aspect of this invention is based on the first aspect thereof, and provides a drive circuit wherein the second means comprises a voltage booster for boosting a voltage of the power supply into a boosting-resultant voltage, and means for generating the gate voltages in response to the boosting-resultant voltage.

A seventh aspect of this invention is based on the first aspect thereof, and provides a drive circuit wherein the source of the second transistor is connected to a first end of the device, and a second end of the device is grounded via the first transistor, and further comprising third means for, in cases where a negative voltage occurs at the source of the second transistor, returning the source voltage of the second transistor to a normal voltage and cancelling the negative voltage.

An eighth aspect of this invention is based on the seventh aspect thereof, and provides a drive circuit wherein a first resistor is connected in parallel with the second transistor, and a second resistor is connected in parallel with the first transistor, and wherein the third means is operative for setting the first transistor in its off state when the negative voltage occurs at the source of the second transistor.

A ninth aspect of this invention is based on the eighth aspect thereof, and provides a drive circuit wherein the first transistor comprises a field-effect transistor, and the third means comprises an operational amplifier for controlling a gate voltage of the first transistor to equalize the source voltage of the second transistor and a reference voltage.

A tenth aspect of this invention is based on the ninth aspect thereof, and provides a drive circuit wherein the operational amplifier comprises means for charging a gate of the first transistor at a constant current.

An eleventh aspect of this invention is based on the ninth aspect thereof, and provides a drive circuit wherein the operational amplifier includes a compensation circuit for getting phase and gain margin, the compensation circuit comprising a capacitance between a gate and a source of the first transistor.

A twelfth aspect of this invention provides a drive circuit for a vehicle occupant safety apparatus, comprising a device for activating the vehicle occupant safety apparatus; a first transistor connected in series with the device; a second transistor connected in series with the device, the second transistor including a field-effect transistor; a third transistor connected to the second transistor, the second and third transistors forming a current mirror circuit, the third transistor including a field-effect transistor; a constant-current source for enabling a constant current to flow through the third transistor; and means for controlling gate voltages of the second and third transistors to equalize voltages at electrodes of the second and third transistors which differ from the bases thereof, and for feeding a constant firing current to the device via the second transistor when the first transistor falls into its on state.

A thirteenth aspect of this invention provides a drive circuit for a vehicle occupant safety apparatus, comprising a device for activating the vehicle occupant safety apparatus; a first transistor connected in series with the device; a second transistor connected in series with the device; a third transistor connected to the second transistor, the second and third transistors forming a current mirror circuit; a constant-current source for enabling a first constant current to flow through the third transistor; and means for feeding a second constant current to the device via the second transistor when the first transistor falls into its on state, the first and second constant currents having a relation depending on a current mirror ratio of the current mirror circuit.

A fourteenth aspect of this invention provides a constant-current control circuit comprising a load; a first transistor connected in series with the load; a second transistor connected to the first transistor, the first and second transistors forming a current mirror circuit; a constant-current source for enabling a first constant current to flow through the second transistor; first means for controlling the first and second transistors to equalize voltages at electrodes of the first and second transistors; and second means for feeding a second constant current to the load via the first transistor, the first and second constant currents having a relation depending on a current mirror ratio of the current mirror circuit.

DESCRIPTION OF THE PREFERRED EMBODIMENTS

First Embodiment

Figure 1:
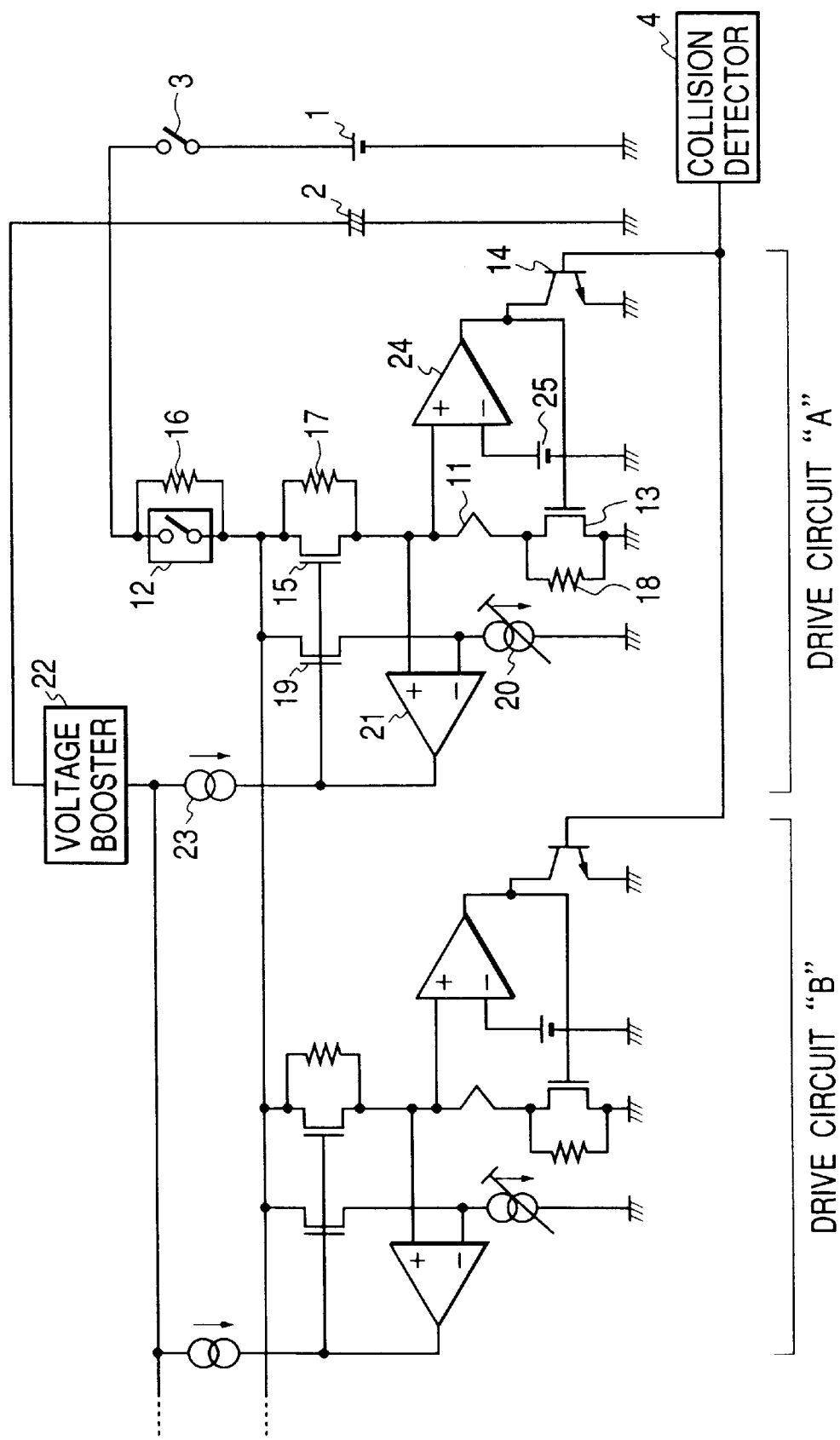
FIG. 1 is a schematic diagram of a vehicle air-bag system according to a first embodiment of this invention.

With reference to FIG. 1, a vehicle air-bag system includes an electric power source 1 such as a vehicle battery. The positive terminal of the vehicle battery 1 is connected to a first end of an energy storage backup capacitor 2 via a vehicle engine ignition switch 3. The negative terminal of the vehicle battery 1 is grounded. Also, a second end of the backup capacitor 2 is grounded. The vehicle engine ignition switch 3 is closed when a vehicle engine is operated. The vehicle engine ignition switch 3 remains closed during operation of the vehicle engine.

The vehicle air-bag system of FIG. 1 includes air bags, and drive circuits for the respective air bags. The drive circuits are connected across the backup capacitor 2. The drive circuits are connected to a collision detector 4. The drive circuits serve to activate the respective air bags in response to an output signal of the collision detector 4.

The collision detector 4 has an acceleration sensor of a semiconductor type which serves to detect acceleration (deceleration) of a vehicle body. The collision detector 4 also has a section for deciding whether or not the vehicle body collides with an object in response to the acceleration (the deceleration) detected by the acceleration sensor. When it is decided that the vehicle body collides with an object, the collision detector 4 outputs a low-level signal as a collision detection signal. Otherwise, the collision detector 4 outputs a high-level signal.

The drive circuits for the respective air bags include drive circuits "A" and "B". The drive circuits "A" and "B" have similar structures. Accordingly, only the drive circuit "A" will be explained in detail.

The drive circuit "A" includes a squib 11 for activating a related air bag in response to a firing current (a drive current). The drive circuit "A" also includes a mechanical-type collision sensor 12, and a power transistor 13. The collision sensor 12 serves as a safing sensor. The power transistor 13 is preferably of an N-channel power MOS type, that is, an N-channel field-effect type. The safing sensor 12 has a switch. The safing sensor switch 12 is connected in series with the squib 11. The drain-source path of the power transistor 13 is connected in series with the squib 11.

The drive circuit "A" further includes an N-channel MOS transistor (an N-channel field-effect transistor) 15 which is referred to as the force transistor 15. The drain-source path of the force transistor 15 is connected in series with the squib 11. As will be explained later, the force transistor 15 serves to feed a constant firing current to the squib 11 when the power transistor 13 is in its on state.

A first end (a hot end) of the squib 11 is connected to the first end of the backup capacitor 2 via the drain-source path of the force transistor 15 and the safing sensor switch 12. A second end (a cold end) of the squib 11 is grounded via the drain-source path of the power transistor 13.

A resistor 16 is connected in parallel with the safing sensor switch 12. A resistor 17 is connected between the drain and the source of the force transistor 15. A resistor 18 is connected between the drain and the source of the power transistor 13.

When an additional circuit (not shown) implements a diagnosis, the power transistor 13 is changed to its on state.

During the execution of the diagnosis, the resistors 15 and 16 enable the feed of a small current to the squib 11 from the vehicle battery 1 or the backup capacitor 2. The small current has such a level as to hold the squib 11 inactive. During the execution of the diagnosis, the small current causes voltages at various test points within the drive circuit "A". These voltages are sensed. The sensed voltages are used in detecting a malfunction of the drive circuit "A".

An NPN transistor 14 serves to drive the power transistor 13. The transistor 14 is referred to as the drive transistor 14. The base of the drive transistor 14 is connected to an output terminal of the collision detector 4. The emitter of the drive transistor 14 is grounded. The collector of the transistor 14 is connected to the gate of the power transistor 13. When the collision detector 4 outputs a low-level signal (a collision detection signal) to the drive transistor 14, the drive transistor 14 falls into an off state so that the power transistor 13 can change to its on state.

An N-channel MOS transistor (an N-channel field-effect transistor) 19 is connected to the force transistor 15. The transistor 19 is referred to as the sense transistor 19. The drain of the sense transistor 19 is connected to the drain of the force transistor 15. The gate of the sense transistor 19 is connected to the gate of the force transistor 15. The force transistor 15 and the sense transistor 19 compose a current mirror circuit. The source of the sense transistor 19 is grounded via a constant-current source 20. The constant-current source 20 serves to regulate a current through the sense transistor 19 at a constant level.

The inverting input terminal of an operational amplifier 21 is connected to the junction between the source of the sense transistor 19 and the constant-current source 20. The non-inverting input terminal of the operational amplifier 21 is connected to the junction between the source of the force transistor 15 and the hot end of the squib 11. The output terminal of the operational amplifier 21 is connected to the gates of the force transistor 15 and the sense transistor 19. The operational amplifier 21 controls the voltage at the gates of the force transistor 15 and the sense transistor 19 so that the source voltage of the force transistor 15 and the source voltage of the sense transistor 19 will be equal to each other. The sense transistor 19, the constant-current source 20, and the operational amplifier 21 cooperate to provide the following process. When the power transistor 13 assumes its on state, the force transistor 15 changes to its on state so that a constant current generated by the vehicle battery 1 and the backup capacitor 2 can flow through the squib 11.

A voltage booster 22 is connected across the backup capacitor 2. The voltage booster 22 generates an increased voltage from the voltage across the vehicle battery 1 (the voltage across the backup capacitor 2). The increased voltage is higher than the voltage across the vehicle battery 1 (the voltage across the backup capacitor 2). The input side of a constant-current circuit 23 is connected to the output side of the voltage booster 22. The output side of the constant-current circuit 23 is connected to the gates of the force transistor 15 and the sense transistor 19. The voltage booster 22 and the constant-current circuit 23 cooperate to provide the following process. Even in the event that the voltage across the vehicle battery 1 (the voltage across the backup capacitor 2) drops to 5 V or less, the gate voltages of the force transistor 15 and the sense transistor 19 can be equal to about 15 V at which the force transistor 15 and the sense transistor 19 can implement the constant-current feed.

The non-inverting input terminal of an operational amplifier 24 is connected to the junction between the source of the force transistor 15 and the hot end of the squib 11. The inverting input terminal of the operational amplifier 24 is connected to the positive terminal of a reference DC power source 25. The negative terminal of the reference DC power source 25 is grounded. The output terminal of the operational amplifier 24 is connected to the junction between the gate of the power transistor 13 and the collector of the drive transistor 14. The operational amplifier 24 can feed a suitable voltage to the gate of the power transistor 13. When the drive transistor 14 is in its on state, the gate of the power transistor 13 is subjected to a low voltage so that the power transistor 13 is in its off state. When the drive transistor 14 assumes its off state, the gate voltage of the power transistor 13 changes to a high level so that the power transistor 13 falls into its on state.

The force transistor 15, the sense transistor 19, the constant-current source 20, the operational amplifier 21, the voltage booster 22, and the constant-current circuit 23 compose a composite constant-current circuit for regulating a firing current flowing through the squib 11. The composite constant-current circuit operates as follows.

In the absence of a collision of the vehicle body against an object, the collision detector 4 outputs a high-level signal to the base of the transistor 14 so that the transistor 14 is in its on state. Accordingly, in this case, a low-level signal is applied to the gate of the power transistor 13, and the power transistor 13 is in its off state.

In the absence of a collision, the composite constant-current circuit holds the force transistor 15 and the sense transistor 19 in their on states. When the current mirror ratio between the force transistor 15 and the sense transistor 19 is equal to 1000:1, the ratio between the on-resistance of the force transistor 15 and the on-resistance of the sense transistor 19 is equal to 1:1000. For example, the on-resistance of the sense transistor 19 is 200 Ω while the on-resistance of the force transistor 15 is 0.2 Ω.

When a constant current provided by the constant-current source 20 is 1.2 mA, the voltage between the drain and the source of the sense transistor 19 is 240 mV (=200 Ω×1.2 mA). It is assumed that the resistances of the resistors 16, 17, and 18 are 1 kΩ, 2 kΩ, and 4 kΩ respectively, and the resistance of the squib 11 is about 2 Ω. In this case, a current flowing through the drain-source path of the force transistor 15 is, for example, 2 mA. Thus, the voltage between the drain and the source of the force transistor 15 is 0.4 mV (=0.2 Ω×2 mA). The voltage between the drain and the source of the force transistor 15 is extremely lower than that of the sense transistor 19.

Since the drain voltages of the force transistor 19 and the sense transistor 15 are equal to each other, the difference between the drain-source voltages of the force transistor 15 and the sense transistor 19 causes a corresponding difference between the source voltages of the force transistor 15 and the sense transistor 19. The operational amplifier 21 provides increased gate voltages of the force transistor 15 and the sense transistor 19 in response to the difference between the source voltages of the force transistor 15 and the sense transistor 19. The increased gate voltages cause the force transistor 15 and the sense transistor 19 to be in their on states.

In the event of a collision of the vehicle body against an object, the collision detector 4 outputs a low-level signal (a collision detection signal) to the base of the transistor 14 so that the transistor 14 falls into its off state. Accordingly, in this case, a high-level signal is applied to the gate of the power transistor 13, and the power transistor 13 falls into its on state.

In the event of a collision, the safing sensor switch 12 falls into an on state (a closed state) before the collision detector 4 outputs a collision detection signal. Therefore, a firing current (a drive current) generated by the vehicle battery 1 and the backup capacitor 2 flows through the safing sensor switch 12, the force transistor 15, the squib 11, and the power transistor 13. The squib 11 activates the related air bag in response to the firing current (the drive current). When the constant-current provided by the constant-current source 20 is 1.2 mA and the current mirror ratio between the force transistor 15 and the sense transistor 19 is 1000:1, the firing current is 1.2 A.

If the firing current flowing through the force transistor 15 increases from 1.2A, the source voltage of the force transistor 15 varies relative to the source voltage of the sense transistor 19. The operational amplifier 21 responds to this variation in the source voltage of the force transistor 15, decreasing the gate voltages of the force transistor 15 and the sense transistor 19. The decrease in the gate voltage of the force transistor 15 reduces the firing current flowing through the force transistor 15.

If the firing current flowing through the force transistor 15 decreases from 1.2A, the source voltage of the force transistor 15 varies relative to the source voltage of the sense transistor 19. The operational amplifier 21 responds to this variation in the source voltage of the force transistor 15, raising the gate voltages of the force transistor 15 and the sense transistor 19. The raise in the gate voltage of the force transistor 15 increases the firing current flowing through the force transistor 15.

As a result of the above-indicated processes, the firing current flowing through the force transistor 15 (that is, the firing current flowing through the squib 11) is regulated at 1.2 A.

The composite constant-current circuit for regulating the firing current through the squib 11 has MOS transistors including the force transistor 15 and the sense transistor 19. The MOS transistors provide good temperature-response characteristics of the composite constant-current circuit. It was experimentally confirmed that the firing current could be regulated at an accuracy of ±3% or less.

Figure 2:
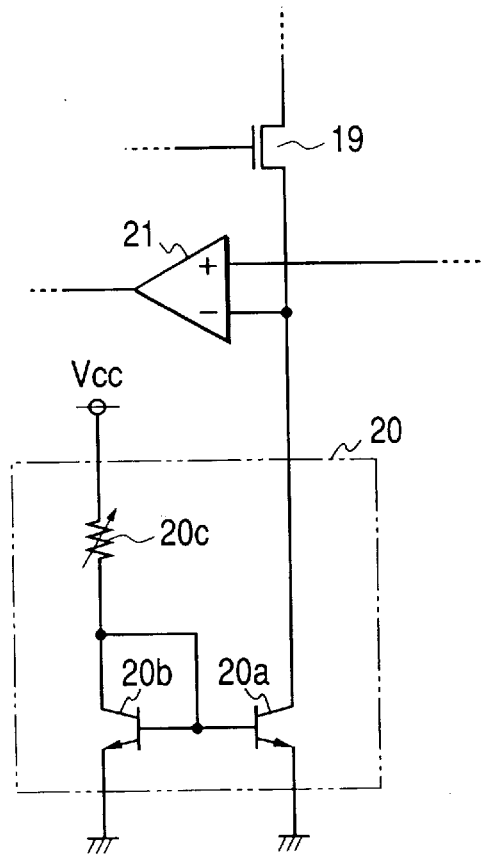
FIG. 2 is a schematic diagram of a constant-current source in FIG. 1.

As shown in FIG. 2, the constant-current source 20 includes NPN bipolar transistors 20a and 20b, and a variable resistor 20. The bases of the transistors 20a and 20b are connected to each other. The emitters of the transistors 20a and 20b are grounded. The collector of the transistor 20a is connected to the source of the sense transistor 19 and the inverting input terminal of the operational amplifier 21. A first end of the variable resistor 20c is connected to a constant-voltage line subjected to a stabilized DC voltage Vcc. The stabilized DC voltage Vcc is generated by a regulated power supply (not shown) connected to the backup capacitor 2. A second end of the variable resistor 20c is connected to the collector of the transistor 20b. The second end of the variable resistor 20c is also connected to the bases of the transistors 20a and 20b. The transistors 20a and 20b compose a current mirror circuit. A current flowing through the transistor 20a is equalized to a current flowing through the transistor 20b. The current flowing through the transistor 20b can be adjusted by the variable resistor 20c. Thus, the current flowing through the transistor 20a can be adjusted by the variable resistor 20c.

In the case where the power transistor 13 is in its on state, if the source voltage of the force transistor 15 falls into a negative region due to noise or the flywheel effect by the inductor formed by the squib 11, the operational amplifier 21 reduces the gate voltages of the force transistor 15 and the sense transistor 19 so that the force transistor 15 and the sense transistor 19 change to their off states. If a suitable countermeasure against the change of the force transistor 15 to its off state is not taken, the force transistor 15 would be locked to its off state after the adverse affection of the noise or the flywheel effect disappears. The operational amplifier 24 and the reference DC power source 25 cooperate to provide a suitable countermeasure against the change of the force transistor 15 to its off state as follows.

The operational amplifier 24 compares the source voltage of the force transistor 15 with the voltage across the reference DC power source 25 which is preset to a low positive voltage (equal to for example, 0.3 V). When the source voltage of the force transistor 15 drops below the voltage across the reference DC power source 25 and then falls into a negative region due to noise or the flywheel effect, the operational amplifier 24 outputs a low voltage to the gate of the power transistor 13. Therefore, the power transistor 13 falls into its off state. When the adverse affection of the noise or the flywheel effect disappears, the source voltage of the force transistor 15 rises and returns to a normal positive region since the power transistor 13 is in its off state and hence the source of the force transistor 15 is not short-circuited to the ground via the power transistor 13. As a result, the operational amplifier 21 increases the gate voltages of the force transistor 15 and the sense transistor 19, and restarts the current regulating process. At the same time, the operational amplifier 24 outputs a high voltage to the gate of the power transistor 13 in response to the rise in the source voltage of the force transistor 15, and the power transistor 13 returns to its on state. Thus, the firing current restarts to normally flow through the squib 11.

The diagnosis includes a check as to whether or not the power transistor 13 can be changed to its on state. The check on the power transistor 13 is implemented when the safing sensor switch 12 is open. The check on the power transistor 13 refers to the voltage at the hot end of the squib 11. During this check, the power transistor 13, the operational amplifier 24, and the reference DC power source 25 cooperate to feedback-control the voltage of the hot end of the squib 11 at a level equal to the voltage across the reference DC power source 25. Thus, the voltage of the hot end of the squib 11 is regulated at a constant level. The regulated voltage provides a high reliability of the check on the power transistor 13.

It should be noted that the operational amplifier 24 may be a conventional comparator.

If the connection line between the source of the force transistor 15 and the hot end of the squib 11 is short-circuited to the ground due to an accident, the source voltage of the force transistor 15 drops to 0 V so that the operational amplifier 21 decreases the gate voltages of the force transistor 15 and the sense transistor 19. Thus, the force transistor 15 and the sense transistor 19 fall into their off states. Accordingly, in this case, only a small current flows into the drive circuit "A", and the other drive circuits (for example, the drive circuit "B") are not adversely affected by the short-circuit in the drive circuit "A".

It is assumed that the power feed from the vehicle battery 1 to the drive circuit "A" is cut off and the drive circuit "A" receives electric power only from the backup capacitor 2 in the event of a collision. In this case, the voltage across the backup capacitor 2 drops as time goes by. Even in this case, the voltage booster 22 provides high gate voltages of the force transistor 15 and the sense transistor 19 so that normal operation of the composite constant-current circuit can be ensured. Since the resistance between the drain and the source of the force transistor 15 can be relatively small, a constant firing current can be fed to the squib 11 even when the voltage across the backup capacitor 2 drops.

Figure 3:
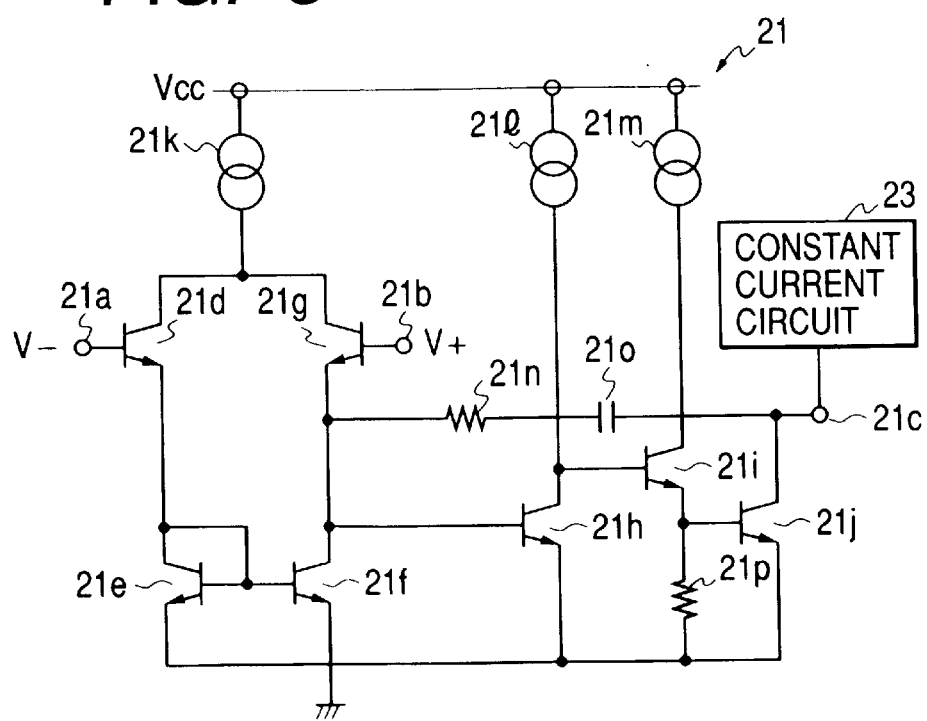
FIG. 3 is a schematic diagram of a first operational amplifier in FIG. 1.

As shown in FIG. 3, the operational amplifier 21 includes an inverting input terminal 21a, a non-inverting input terminal 21b, and an output terminal 21c. The inverting input terminal 21a is connected to the junction between the source of the sense transistor 19 (see FIG. 1) and the input side of the constant-current source 20 (see FIG. 1). The non-inverting input terminal 21b is connected to the junction between the source of the force transistor 15 (see FIG. 1) and the hot end of the squib 11 (see FIG. 1). The output terminal 21c is connected to the gates of the force transistor 15 (see FIG. 1) and the sense transistor 19 (see FIG. 1). The output terminal 21c is also connected to the output side of the constant-current circuit 23 (see FIG. 1).

The operational amplifier 21 also includes a PNP transistor 21d, an NPN transistor 21e, an NPN transistor 21f, a PNP transistor 21g, a PNP transistor 21h, an NPN transistor 21i, and an NPN transistor 21j. The operational amplifier 21 further includes constant-current sources 21k, 21l, and 21m, a resistor 21n, a capacitor 21o, and a resistor 21p.

A first end of the constant-current source 21k is connected to a constant-voltage line subjected to the stabilized DC voltage Vcc. A second end of the constant-current source 21k is connected to the emitters of the transistors 21d and 21g. The base of the transistor 21d is connected to the inverting input terminal 21a. The base of the transistor 21g is connected to the non-inverting input terminal 21b. The collector of the transistor 21d is connected to the collector of the transistor 21e. The bases of the transistors 21e and 21f are connected to each other. The collector of the transistor 21d is connected to the bases of the transistors 21e and 21f. The emitters of the transistors 21e and 21f are grounded. The collector of the transistor 21g is connected to the collector of the transistor 21f.

A first end of the constant-current source 21l is connected to the constant-voltage line subjected to the stabilized DC voltage Vcc. A second end of the constant-current source 21l is connected to the emitter of the transistor 21h and the base of the transistor 21i. The base of the transistor 21h is connected to the junction between the collectors of the transistors 21g and 21f. The collector of the transistor 21h is grounded.

A first end of the constant-current source 21m is connected to the constant-voltage line subjected to the stabilized DC voltage Vcc. A second end of the constant-current source 21m is connected to the collector of the transistor 21i. The emitter of the transistor 21i is connected to the base of the transistor 21j. The emitter of the transistor 21i is grounded via the resistor 21p. The collector of the transistor 21j is connected to the output terminal 21c. The emitter of the transistor 21j is grounded.

A first end of the resistor 21n is connected to the junction between the collectors of the transistors 21g and 21f. A second end of the resistor 21n is connected to a first end of the capacitor 21o. A second end of the capacitor 21o is connected to the junction between the collector of the transistor 21j and the output terminal 21c. The resistor 21n and the capacitor 21o cooperate to provide a phase delay.

The operational amplifier 21 of FIG. 3 operates as follows. When the voltage at the inverting input terminal 21a drops relative to the voltage at the non-inverting input terminal 21b, a current flowing through the transistor 21d increases so that the transistors 21e and 21f fall into on states. As a result, the transistor 21h changes to an on state, and the transistors 21i and 21j change to off states. Thus, the voltage at the output terminal 21c is increased by a current fed from the constant-current circuit 23.

When the voltage at the inverting input terminal 21a rises relative to the voltage at the non-inverting input terminal 21b, a current flowing through the transistor 21g increases. As a result, the transistor 21h changes to an off state, and the transistors 21i and 21j change to on states. Thus, the voltage at the output terminal 21c drops.

The above-indicated processes implemented by the operational amplifier 21 cause the composite current-constant circuit to equalize the voltage at the inverting input terminal 21a and the voltage at the non-inverting input terminal 21b.

The output terminal 21c leads to the squib 11 via the force transistor 15. The squib 11 has an inductance. The phase of the voltage outputted from the operational amplifier 21 is advanced by the inductance of the squib 11. On the other hand, the resistor 21n and the capacitor 21o retard the phase of the voltage outputted from the operational amplifier 21. Accordingly, the phase of the voltage outputted from the operational amplifier 21 is suitably adjusted, and the output voltage is prevented from oscillating.

It is preferable that the operational amplifier 21 is formed in an integrated circuit (an IC). A small capacitance of the capacitor 21o suffices due to the presence of the resistor 21n. The small capacitance of the capacitor 21o makes it possible to easily form the operational amplifier 21 in an integrated circuit (an IC).

Figure 4:
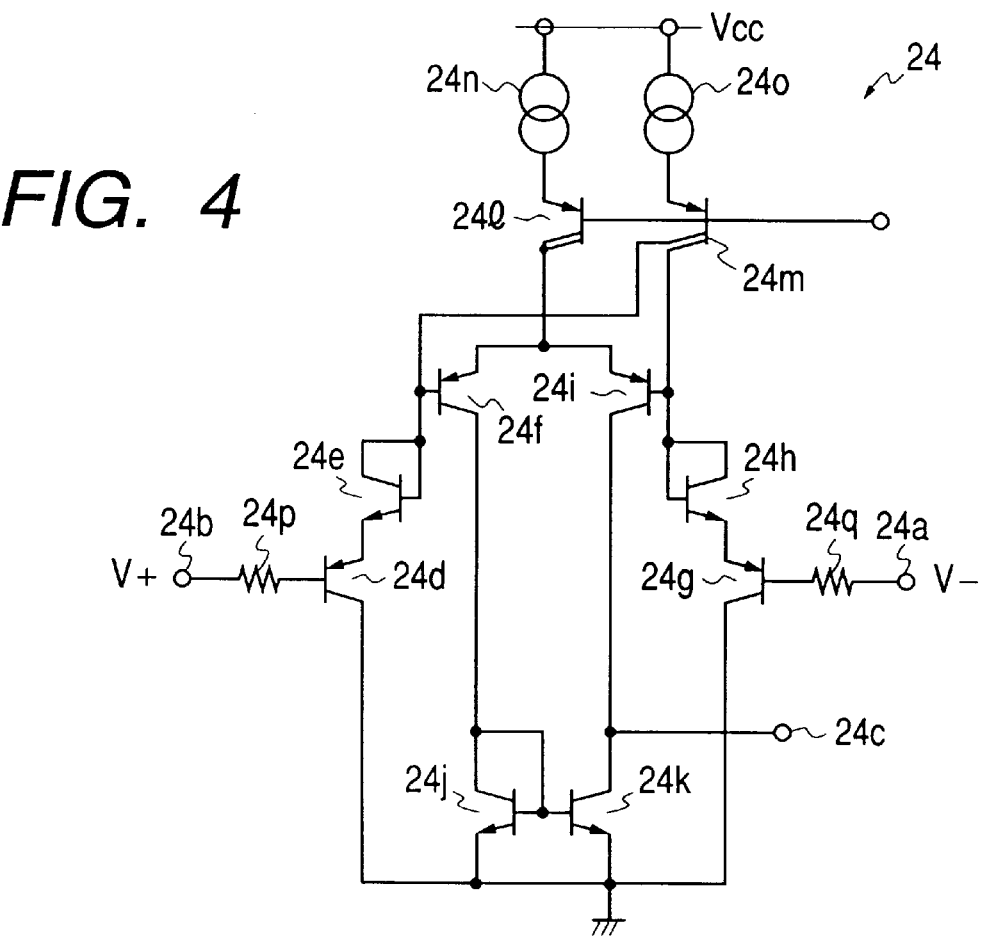
FIG. 4 is a schematic diagram of a second operational amplifier in FIG. 1.

As shown in FIG. 4, the operational amplifier 24 includes an inverting input terminal 24a, a non-inverting input terminal 24b, and an output terminal 24c. The inverting input terminal 24a is connected to the positive terminal of the reference DC power source 25 (see FIG. 1). The non-inverting input terminal 24b is connected to the junction between the source of the force transistor (see FIG. 1) and the hot end of the squib 11 (see FIG. 1). The output terminal 21c is connected to the junction between the base of the power transistor 13 (see FIG. 1) and the collector of the drive transistor 14 (see FIG. 1).

The operational amplifier 24 also includes a PNP transistor 24d, an NPN transistor 24e, a PNP transistor 24f, a PNP transistor 24g, an NPN transistor 24h, a PNP transistor 24i, an NPN transistor 24j, and an NPN transistor 24k. The operational amplifier 24 further includes a PNP transistor set 24l in which plural PNP transistors are connected in parallel. The operational amplifier 24 also includes a PNP transistor set 24m in which plural PNP transistors are connected in parallel regarding bases and emitters. The operational amplifier 24 further includes constant-current sources 24n and 24o, and resistors 24p and 24q.

A first end of the constant-current source 24n is connected to a constant-voltage line subjected to the stabilized DC voltage Vcc. A second end of the constant-current source 24n is connected to the emitters in the transistor set 24l. The collectors in the transistor set 24l are connected to the emitters of the transistors 24f and 24i. The base of the transistor 24f is connected to the base of the transistor 24e and the collector of the transistor 24e. The emitter of the transistor 24e is connected to the emitter of the transistor 24d. The base of the transistor 24d is connected via the resistor 24p to the non-inverting input terminal 24b. The collector of the transistor 24d is grounded.

The collector of the transistor 24f is connected to the collector of the transistor 24j. The bases of the transistors 24j and 24k are connected to each other. The collector of the transistor 24f is also connected to the bases of the transistors 24j and 24k. The emitters of the transistors 24j and 24k are grounded.

A first end of the constant-current source 24o is connected to the constant-voltage line subjected to the stabilized DC voltage Vcc. A second end of the constant-current source 24o is connected to the emitters in the transistor set 24m. A first collector in the transistor set 24m is connected to the base of the transistor 24f, the collector of the transistor 24e, and the base of the transistor 24e. A second collector in the transistor set 24m is connected to the base of the transistor 24i, the collector of the transistor 24h, and the base of the transistor 24h.

The collector of the transistor 24i is connected to the collector of the transistor 24k. The output terminal 24c is connected to the junction between the collectors of the transistors 24i and 24k.

The emitter of the transistor 24h is connected to the emitter of the transistor 24g. The collector of the transistor 24g is grounded. The base of the transistor 24g is connected via the resistor 24q to the inverting input terminal 24a.

Bases in the transistor sets 24l and 24m are connected in common. Each of the transistor sets 24l and 24m can change between an on state and an off state in response to a voltage at the bases therein. A suitable device (not shown) may control the voltage at the bases in each of the transistor sets 24l and 24m. Normally, the transistors sets 24l and 24m are in their on states.

The operational amplifier 24 of FIG. 4 operates as follows. When the voltage at the inverting input terminal 24a rises relative to the voltage at the non-inverting input terminal 24b, the base voltage of the transistor 24i becomes higher than the base voltage of the transistor 24f. Therefore, a constant current generated by the constant-current source 24n enters the emitter of the transistor 24f via the transistor set 24l, and flows through the emitter-collector path of the transistor 24f. Then, the constant current flows through the transistor 24j.

The transistors 24j and 24k compose a current mirror circuit. Accordingly, a constant current, which is equal to the constant current flowing through the transistor 24j, is required to flow through the transistor 24k. In this case, the transistor 24k draws charges from the gate of the power transistor 13 (see FIG. 1) at a constant rate. Thus, the gate of the power transistor 13 (see FIG. 1) is discharged at a constant current which flows through the transistor 24k via the output terminal 24c.

When the voltage at the non-inverting input terminal 24b rises relative to the voltage at the inverting input terminal 24a, the base voltage of the transistor 24f becomes higher than the base voltage of the transistor 24i. Therefore, the constant current generated by the constant-current source 24n enters the emitter of the transistor 24i via the transistor set 24l, and flows through the emitter-collector path of the transistor 24i. At this time, the transistor 24k is in its off state. Thus, the constant current enters the gate of the power transistor 13 via the output terminal 24c after flowing through the transistor 24i. Accordingly, the gate of the power transistor 13 (see FIG. 1) is charged by the constant current.

It is preferable that the operational amplifier 24 is formed in an integrated circuit (an IC). There is a parasitic capacitance between the gate and the source of the power transistor 13 (see FIG. 1) which is equal to, for example, about 500 pF to about 3,000 pF. The operational amplifier 24 uses the parasitic capacitance, and implements the constant-current charging process and the constant-current discharging process with respect to the parasitic capacitance. Thereby, the operational amplifier 24 delays its output signal and prevents oscillation of the output signal. Accordingly, it is unnecessary to provide the operational amplifier 24 with a phase compensation capacitor. This makes it possible to easily form the operational amplifier 24 in an integrated circuit (an IC).

It should be noted that the combination of the transistors 24e and 24f may be replaced by a single transistor. Similarly, the combination of the transistors 24h and 24i may be replaced by a single transistor.

Also, it should be noted that the operational amplifier 21 may be of a structure similar to the structure shown in FIG. 4. The operational amplifier 24 may be of a structure similar to the structure shown in FIG. 3.

Furthermore, it should be noted that the force transistor 15 and the sense transistor 19 may be composed of bipolar transistors or NPN transistors.

The safing sensor switch 12 may be moved to a position between the source of the power transistor 13 and the ground. The squib 11 may be moved to a position between the hot end of the composite constant-current circuit and the positive terminal of the vehicle battery 1.

The vehicle air-bag system of FIG. 1 may be modified to control pre-loaders or other devices rather than the air bags.

The composite constant-current circuit may be used in controlling an inductive load, a motor, a lamp, or a buzzer.

The constant-current source 20 may be designed so that the value of the regulated current provided thereby can be adjusted in accordance with an externally-fed instruction. Alternatively, the constant-current source 20 may adjust the value of the regulated current in response to a command value fed from a suitable memory such as a nonvolatile memory.

Second Embodiment

Figure 5:
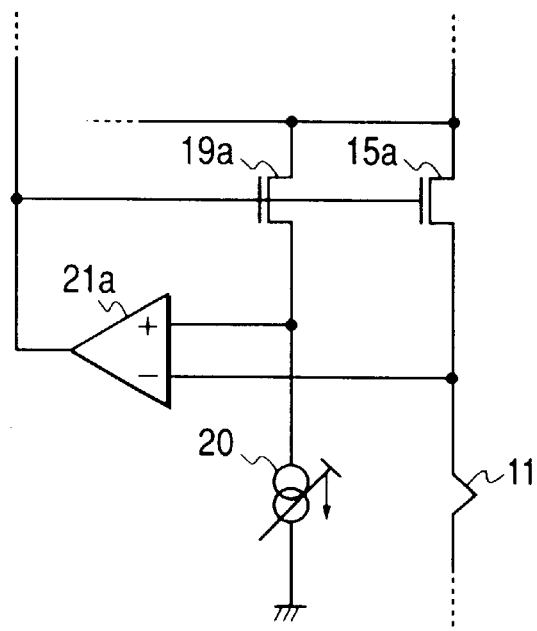
FIG. 5 is a schematic diagram of a portion of a vehicle air-bag system according to a second embodiment of this invention.

FIG. 5 shows a second embodiment of this invention which is similar to the embodiment of FIG. 1 except for design changes indicated hereinafter. The embodiment of FIG. 5 includes a force transistor 15a and a sense transistor 19a instead of the force transistor 15 and the sense transistor 19 in FIG. 5. The force transistor 15a and the sense transistor 19a are of P-channel MOS types. The embodiment of FIG. 5 includes an operational amplifier 21a instead of the operational amplifier 21 in FIG. 1.

The sources of the force transistor 15a and the sense transistor 19a are connected in common. The operational amplifier 21a controls gate voltages of the force transistor 15a and the sense transistor 19a to equalize drain voltages thereof.

The drain of the force transistor 15a is connected to the inverting input terminal of the operational amplifier 21a. The drain of the sense transistor 19a is connected to the non-inverting input terminal of the operational amplifier 21a.

The constant-current source 20 enables a constant current to flow through the sense transistor 19a, and hence the voltage between the source and the drain of the sense transistor 19a can be constant. If a firing current flowing through the force transistor 15a increases, the drain voltage of the force transistor 15a varies relative to the drain voltage of the sense transistor 19a. The operational amplifier 21a responds to this variation in the drain voltage of the force transistor 15a, increasing the gate voltages of the force transistor 15a and the sense transistor 19a. The increase in the gate voltage of the force transistor 15a reduces the firing current flowing through the force transistor 15a.

If the firing current flowing through the force transistor 15a decreases, the drain voltage of the force transistor 15a varies relative to the drain voltage of the sense transistor 19a. The operational amplifier 21a responds to this variation in the drain voltage of the force transistor 15a, dropping the gate voltages of the force transistor 15a and the sense transistor 19a. The drop in the gate voltage of the force transistor 15a increases the firing current flowing through the force transistor 15a.

As a result of the above-indicated processes, the firing current flowing through the force transistor 15a (that is, the firing current flowing through the squib 11) is regulated at a constant level.

It should be noted that the force transistor 15a and the sense transistor 19a may be composed of bipolar transistors or PNP transistors.

Third Embodiment

Figure 6:
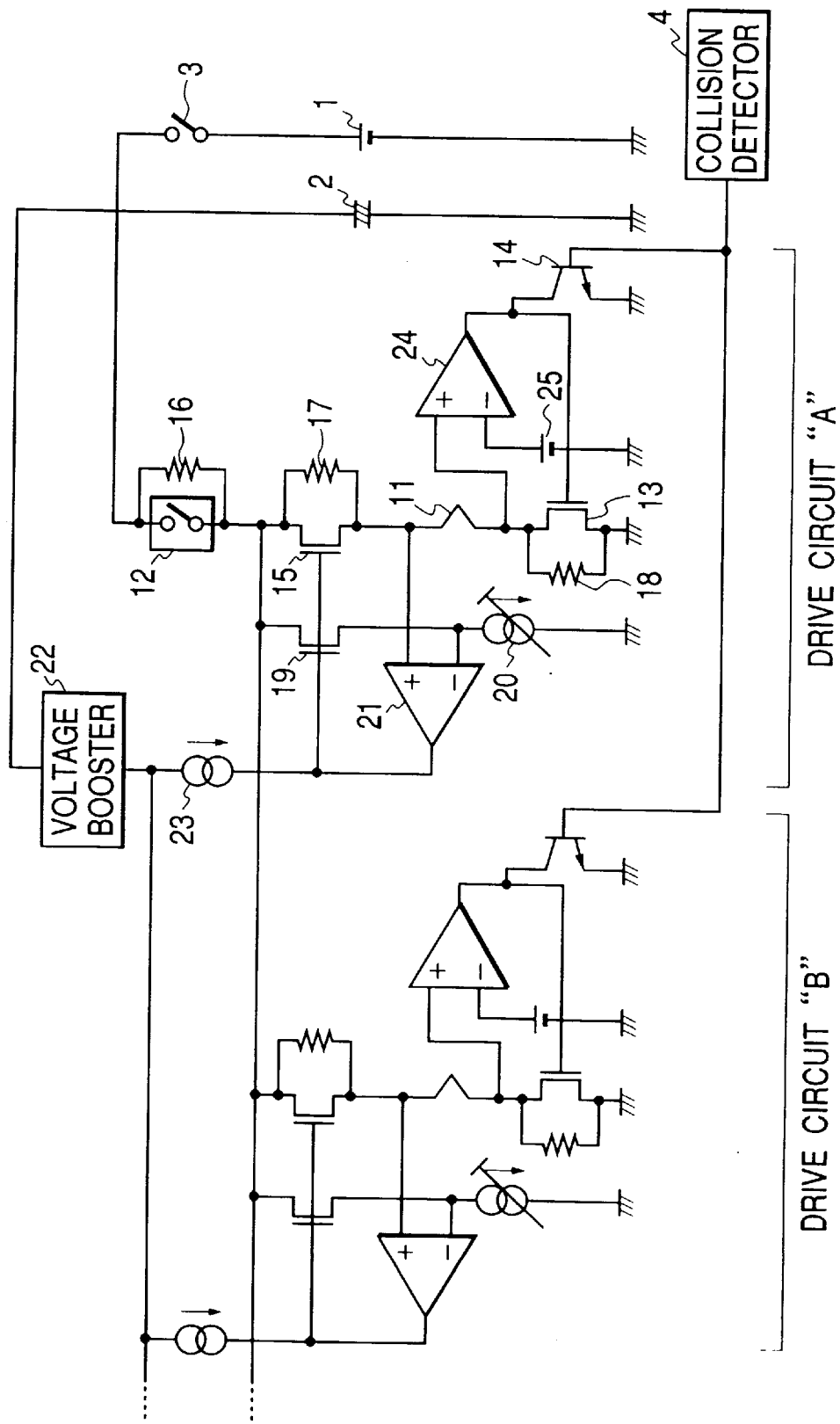
FIG. 6 is a schematic diagram of a vehicle air-bag system according to a third embodiment of this invention.

FIG. 6 shows a third embodiment of this invention which is similar to the embodiment of FIG. 1 except for design changes indicated hereinafter.

In the embodiment of FIG. 6, the non-inverting input terminal of the operational amplifier 24 is connected to the junction between the cold end of the squib 11 and the drain of the power transistor 13. Therefore, the squib 11 is located outside the feedback control loop including the operational amplifier 24. Thus, the resistance of the squib 11 and the inductance of the connection to the squib 11 are prevented from causing the feedback control loop to oscillating the voltage across the squib 11.

What is claimed is:

1. A drive circuit for a vehicle occupant safety apparatus, comprising:
   a device for activating the vehicle occupant safety apparatus;
   a first transistor connected in series with the device;
   a power supply; and
   a constant-current circuit receiving electric energy from the power supply, and feeding a constant current to the device when the first transistor falls into its on state;
   wherein the constant-current circuit comprises:
   a) a second transistor connected in series with the device, the second transistor including an N-channel field-effect transistor;
   b) a third transistor connected to the second transistor, the second and third transistors forming a current mirror circuit, the third transistor including an N-channel field-effect transistor;
   c) first means for regulating a voltage between a gate and a source of the third transistor at a constant level; and
   d) second means for controlling gate voltages of the second and third transistors in response to source voltages of the second and third transistors to equalize the source voltages of the second and third transistors.

2. A drive circuit as recited in claim 1, wherein the first means comprises a constant-current source for enabling a constant current to flow through the third transistor.

3. A drive circuit as recited in claim 1, wherein the second means comprises an operational amplifier having a non-inverting input terminal, an inverting input terminal, and an output terminal, the non-inverting input terminal being subjected to the source voltage of the second transistor, the inverting input terminal being subjected to the source voltage of the third transistor, the output terminal being connected to gates of the second and third transistors.

4. A drive circuit as recited in claim 3, wherein the operational amplifier includes a compensation circuit for getting phase and gain margin, the compensation circuit comprising a resistor and a capacitor.

5. A drive circuit as recited in claim 3, wherein the operational amplifier comprises means for charging and discharging the gates of the second and third transistors at a constant current.

6. A drive circuit as recited in claim 1, wherein the second means comprises a voltage booster (22) for boosting a voltage of the power supply into a boosting-resultant voltage, and means for generating the gate voltages in response to the boosting-resultant voltage.

7. A drive circuit as recited in claim 1, wherein the source of the second transistor is connected to a first end of the device, and a second end of the device is grounded via the first transistor, and further comprising third means for, in cases where a negative voltage occurs at the source of the second transistor, returning the source voltage of the second transistor to a normal voltage and cancelling the negative voltage.

8. A drive circuit as recited in claim 7, wherein a first resistor is connected in parallel with the second transistor, and a second resistor is connected in parallel with the first transistor, and wherein the third means is operative for setting the first transistor in its off state when the negative voltage occurs at the source of the second transistor.

9. A drive circuit as recited in claim 8, wherein the first transistor comprises a field-effect transistor, and the third means comprises an operational amplifier for controlling a gate voltage of the first transistor to equalize the source voltage of the second transistor and a reference voltage.

10. A drive circuit as recited in claim 9, wherein the operational amplifier comprises means for charging a gate of the first transistor at a constant current.

11. A drive circuit as recited in claim 9, wherein the operational amplifier includes a compensation circuit for getting phase and gain margin, the compensation circuit comprising a capacitance between a gate and a source of the first transistor.

12. A drive circuit for a vehicle occupant safety apparatus, comprising:
    a device for activating the vehicle occupant safety apparatus;
    a first transistor connected in series with the device;
    a second transistor connected in series with the device;
    a third transistor connected to the second transistor, the second and third transistors forming a current mirror circuit;
    a constant-current source for enabling a first constant current to flow through the third transistor; and
    means for feeding a second constant current to the device via the second transistor when the first transistor falls into its on state, the first and second constant currents having a relation depending on a current mirror ratio of the current mirror circuit.

13. A constant-current control circuit comprising:
    a load;
    a first transistor connected in series with the load;
    a second transistor connected to the first transistor, the first and second transistors forming a current mirror circuit;
    a constant-current source for enabling a first constant current to flow through the second transistor;
    first means for controlling the first and second transistors to equalize voltages at electrodes of the first and second transistors; and
    second means for feeding a second constant current to the load via the first transistor, the first and second constant currents having a relation depending on a current mirror ratio of the current mirror circuit.

* * * * *

UNITED STATES PATENT AND TRADEMARK OFFICE
CERTIFICATE OF CORRECTION

PATENT NO.     : 5,977,651
DATED          : November 2, 1999
INVENTOR(S)    : UEDA et al.

It is certified that error appears in the above-identified patent and that said Letters Patent is hereby corrected as shown below:

On the title page: Item

[30] Foreign Application Priority Data

Please change

" Jun. 5, 1996     [JP]     Japan . . . . . . . . . . . . . . 8-143050

May 12, 1997      [JP]     Japan . . . . . . . . . . . . . . 9-121150"

to

-- Nov. 1, 1996   [JP]     Japan . . . . . . . . . . . . . . 8-291767

Feb. 14, 1997     [JP]     Japan . . . . . . . . . . . . . . 9-30485 --.

Signed and Sealed this

Nineteenth Day of December, 2000

Attest:

Q. TODD DICKINSON

*Attesting Officer*     *Commissioner of Patents and Trademarks*